Sept. 8, 1970 M. A. JOHNSON, JR 3,527,278
APPARATUS FOR MULCHING VEGETATION
Filed Feb. 28, 1968 2 Sheets-Sheet 1
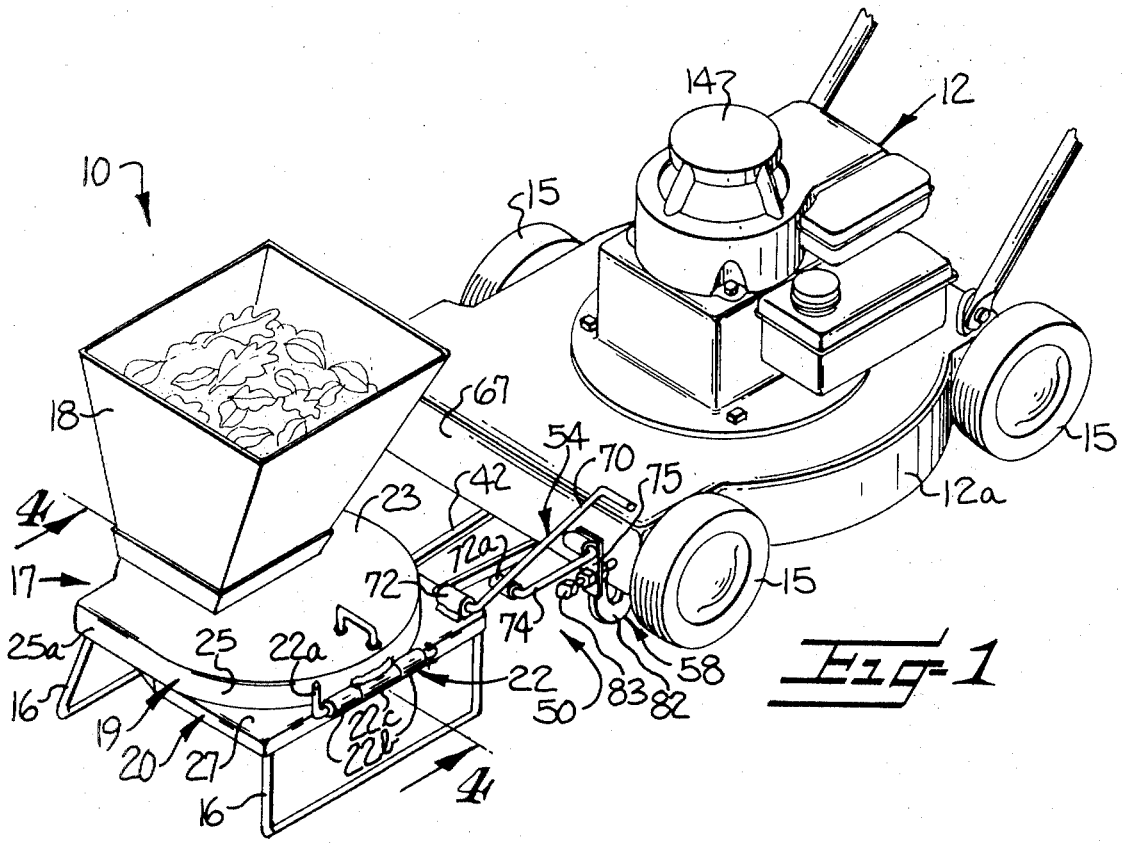
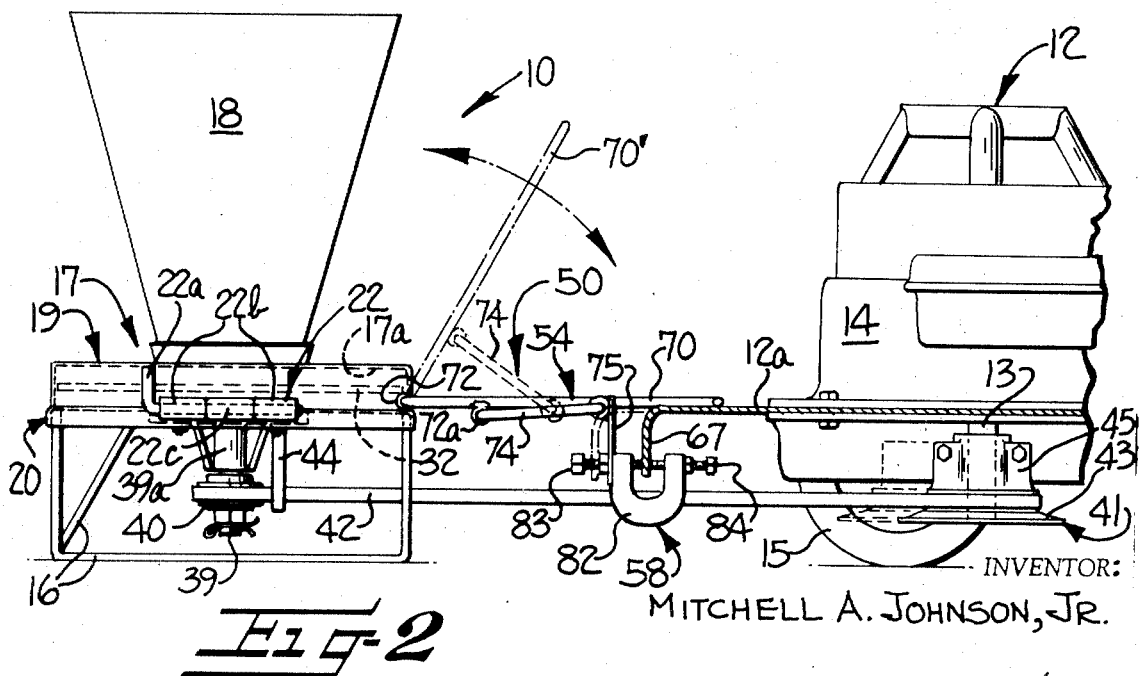
INVENTOR:
MITCHELL A. JOHNSON, JR.
BY Parrott, Bell, Seltzer, Park & Gibson
ATTORNEYS

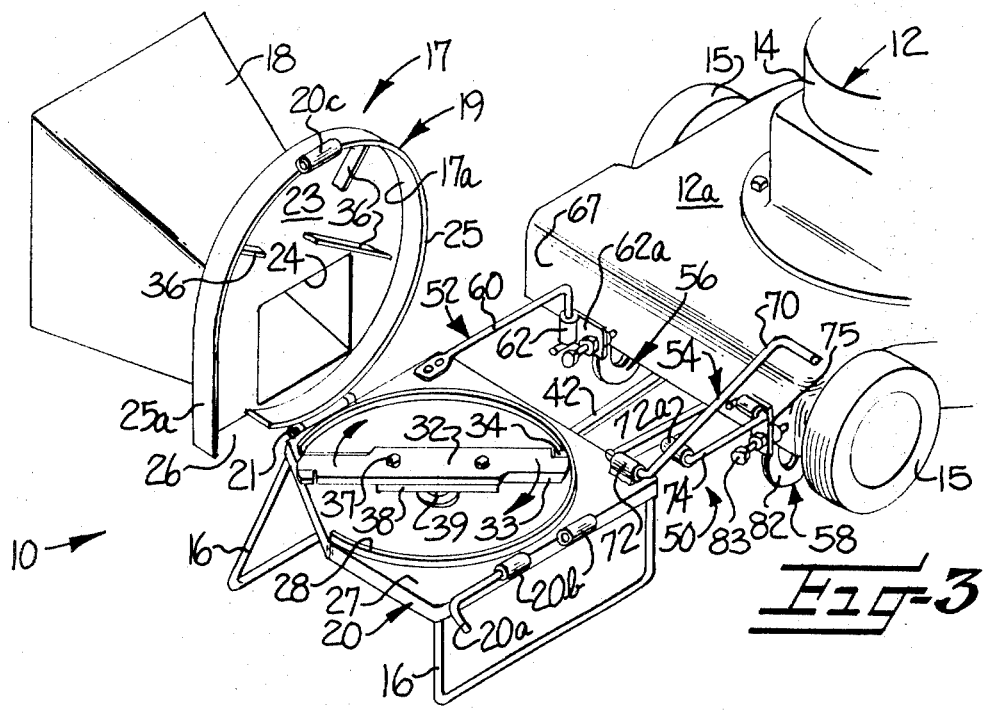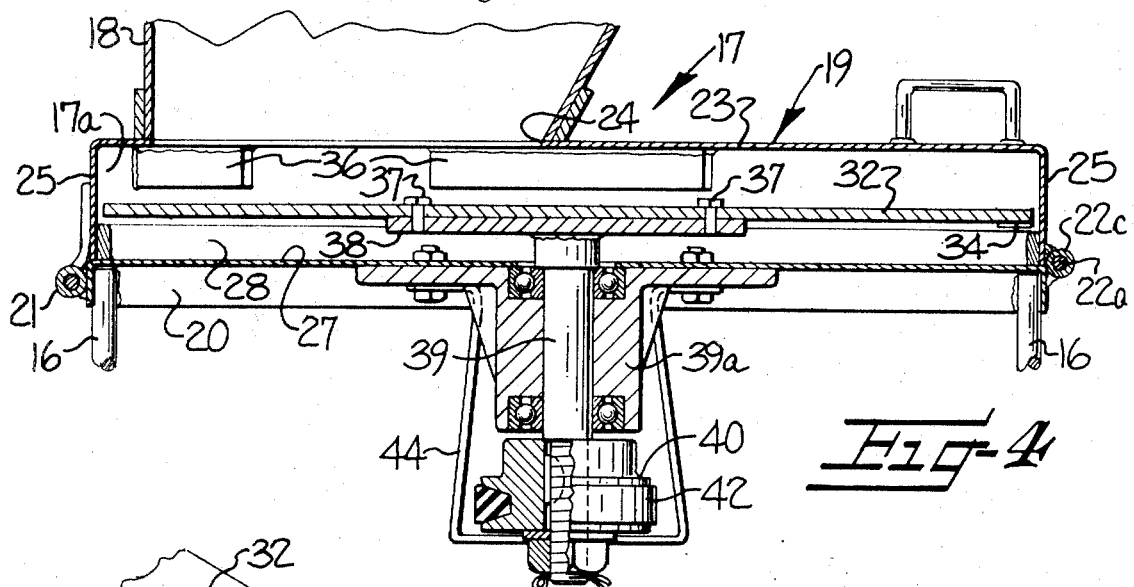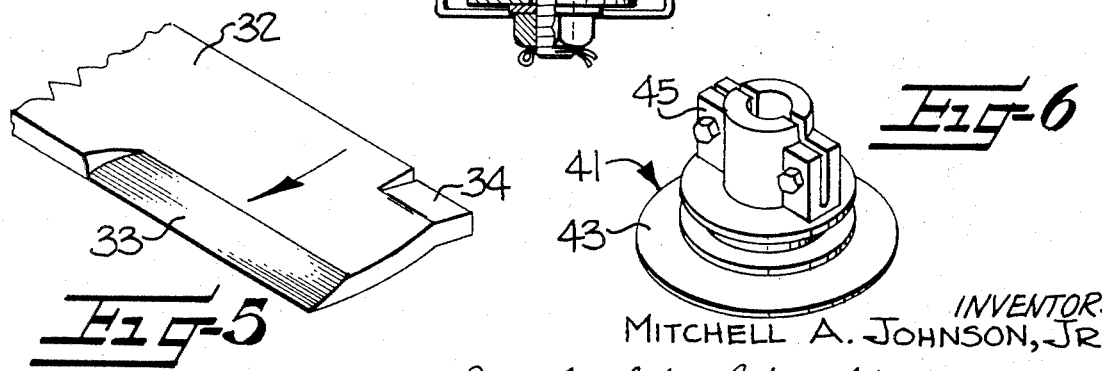

United States Patent Office 3,527,278
Patented Sept. 8, 1970

3,527,278
APPARATUS FOR MULCHING VEGETATION
Mitchell A. Johnson, Jr., Rte. 5, Box 447,
Taylorsville, N.C. 28681
Filed Feb. 28, 1968, Ser. No. 709,049
Int. Cl. A01d 55/00; B02c 18/12
U.S. Cl. 146—124                                  12 Claims

ABSTRACT OF THE DISCLOSURE

A mulching device driven by power from an adjacent power driven rotary lawn mower comprising a mulching chamber having rotatable cutting means therein for shredding vegetation, a rotatable drive shaft for the cutting means, means for connecting the mulching device to the lawn mower and for maintaining the respective shafts thereof in horizontally spaced relation, and means for connecting the drive shaft to a driven shaft of the lawn mower to operate the cutting means of the mulching device.

---

This invention relates to mulching apparatus and more particularly to an improved vegetation mulching device having means adapting it to be operatively driven by power from an adjacently positioned power driven rotary type lawn mower.

Various devices for mulching vegetation, such as dead leaves, grass, underbrush, and the like are often employed by homeowners and gardeners to dispose of unsightly and undesired dead vegetation which accumulates on lawns and in other areas about the home. Decayed vegetation provides an excellent source of fertilizer for application to garden plants, growing shrubs, lawns and the like, and a mulching operation considerably reduces the volume of the vegetation to facilitate its storage, and also permits a faster rate of decay of the vegetation for its use as a fertilizer.

Power driven mulching apparatus for home and garden use may be of several types—the self-powered mulching devices which have their own power supply, or motor, for rotatably driving their cutting mechanisms, or various lawn mower attachments, such as closure screens, plates, and cutting blades, which may be secured to the housing of a power driven rotary lawn mower to convert the mower housing into a mulching compartment. Although the self-powered mulching devices are quite effective in their operation, they are relatively expensive to purchase, and therefore are uneconomical for the occasional use of the average homeowner or small gardener. While the mulching attachments for rotary type lawn mowers may reduce the initial cost of obtaining mulching equipment, they also have several disadvantages. Since rotary lawn mowers are designed to cut growing vegetation and immediately discharge it from the housing, their cutting blades are not designed principally for a mulching operation. Thus when only a baffle plate is attached over the discharge outlet of the lawn mower housing, and the mower moved over vegetation to be mulched, the mulching operation is quite inefficient and requires many passes of the vegetation through the mower housing to properly shred the vegetation. With the more complicated type attachments which include feed hoppers and closure plates for the bottom of the mower housing and employ additional cutting blades on the lawn mower drive shaft, it is difficult to provide a single attachment unit which will readily fit all size lawn mowers. Also such attachments are difficult to attach and disattach from the lawn mower, and consume a considerable amount of the homeowner's time in converting and reconverting the lawn mower from a mulching to a lawn cutting operation.

It is therefore an object of the present invention to provide a vegetation mulching device for use by homeowners, gardeners and the like which overcomes the problems heretofore encountered in the employment of apparatus of the type described.

It is another object of the present invention to provide a vegetation mulching device which is self-contained except for its power unit, and which may be quickly and easily attached to and driven by the power means of a conventional power driven rotary type lawn mower positioned adjacent the mulching device whereby the efficiency of the self-powered mulching devices may be obtained at substantially reduced costs.

It is a further object to provide a mulching device of the type described which is lightweight and highly portable, and which is adapted to be connected to and driven by various rotary-type power lawn mowers with only slight modification of the mower.

It is a more specific object to provide a mulching device of the type described wherein the operation of the mulching device may be controlled while permitting continuous operation of the power means of the lawn mower.

Some of the objects of the invention having been stated, other objects will appear as the description proceeds, when taken in connection with the accompanying drawings, in which—

FIG. 1 is an isometric view of a mulching device of the present invention shown in operative relation to an adjacently positioned rotary-type power lawn mower;

FIG. 2 is an enlarged elevational view of the mulching device and a portion of the lawn mower shown in FIG. 1;

FIG. 3 is an isometric view of the mulching device and a portion of the lawn mower shown in FIG. 1, with the feed hopper and upper housing section of the mulching chamber pivotally displaced from the lower housing section of the mulching chamber and support frame of the mulching device, and showing, in more detail, the means for connecting the mulching device to the mower housing of the adjacent lawn mower.

FIG. 4 is an enlarged cross-sectional view of the mulching chamber of the mulching device taken along line 4—4 in FIG. 1 and looking in the direction of the arrows;

FIG. 5 is an enlarged fragmentary isometric view of an end portion of the cutting blade of the mulching device; and FIG. 6 is an isometric view of the pulley attachment which is secured to the driven shaft of the power lawn mower to permit transmission of rotation between the lawn mower and the mulching device.

Referring more specifically to the drawings, FIG. 1 shows a mulching device 10 of the present invention which is positioned closely adjacent the front of a power driven lawn mower 12, both of which are supported on a suitable supporting surface, such as the ground. The lawn mower 12 is of conventional rotary-type construction and includes an open bottom mower housing 12a having a rotatably driven shaft 13 (FIG. 2) vertically disposed therein, power means, such as a motor 14, mounted on the housing 12a and operatively connected, in a manner not shown, to the driven shaft 13 to impart rotation thereto, and wheels 15 rotatably mounted at the corners of the mower housing 12a and which serve as means to space the housing above a supporting surface for movement thereover.

The mulching device 10 generally includes a support frame 16, means 17 defining a mulching chamber 17a, and a gravity feed hopper 18 attached to the means 17 and communicating with the mulching chamber 17a and positioned thereabove for the reception of leaves and other vegetation to be mulched.

Means 17 includes upper and lower housing sections 19, 20 which are constructed of suitably rigid material, such as sheet metal, and are pivotally connected by a hinge member 21 (FIG 3) at one side thereof to permit pivotal separation of the sections for ready access to the mulching chamber 17a for cleaning and maintenance. The sections 19, 20 are held in operative relation (FIGS. 1 and 2) during the mulching operation by a latch mechanism 22, which consists of a locking pin 22a which frictionally engages aligned tubular sections 22b on the lower housing section and a tubular section 22c on the upper housing section.

As best seen in FIGS. 3 and 4, the upper housing section 19 includes a horizontal upper wall 23 having an inlet opening 24 communicating with the open lower end of the feed hopper 18 for the introduction of leaves and other vegetation to be mulched into the mulching chamber 17a. The upper housing section 19 further includes a generally circular vertical side wall 25 which has a short, generally straight portion 25a and an opening 26 adjacent thereto which together form a tangential outlet for discharge of mulched vegetation from the chamber 17a during operation of the mulching device.

The lower housing section 20 of the mulching chamber defining means 17 includes a generally horizontal bottom wall 27 and a generally circular upstanding rib 28 attached thereto, which rib, as best shown in FIG. 4, engages the inner face of the vertical side wall 25 of the upper housing section to insure alignment of the sections 19 and 20 when they are secured in operative relation.

Cutting means, shown as a cutting blade 32, is provided in the mulching chamber 17a for rotation about a substantially vertical axis. As best seen in FIGS. 3 and 5, the leading edge of each end of the cutting blade 32 has a cutting surface 33 and the trailing edge portion 34 of the blade behind each cutting surface 33 is disposed downwardly to direct vegetation being cut in the mulching chamber 17 downwardly therein during rotation of the blade and thereby facilitate proper feed of leaves from the feed hopper 18 into the mulching chamber 17a and to agitate vegetation in the chamber during the mulching operation. Additionally, the horizontal wall 23 of the upper housing section 19 is provided with downwardly extending vanes or baffles 36 which contact leaves and other vegetation circulating in the mulching chamber 17a to retard their discharge from the chamber and insure relative movement between the vegetation and the cutting blade 32, thereby providing for better mulching action.

As best seen in FIG. 4, the cutting blade 32 is removably secured by bolts 37 to a horizontal plate 38 attached to the upper end of a vertically extending drive shaft 39 which is itself rotatably mounted in a journal member 39a secured to the horizontal wall 27 of the lower housing section 20. The lower end of the drive shaft 39 extends below the mulching chamber defining means 17 and terminates a short distance above the surface on which the mulching device is supported.

As best seen in FIG. 2, rotatable means are provided for operatively connecting the drive shaft 39 of the mulching device and the driven shaft 13 of the rotary lawn mower for transmitting rotation from the driven shaft of the lawn mower to the drive shaft of the mulching device for operation of the cutting means in the mulching chamber. The rotatable means comprises first and second pulleys 40, 41 respectively mounted on the drive shaft 39 of the mulching device and the driven shaft 13 of the lawn mower 12 in a generally common horizontal plane, and a pulley belt 42 entrained about the pulleys 40, 41 for transmitting rotation therebetween. As best seen in FIGS. 2 and 6, the lower face of the pulley 41 is provided with a radially extending flange 43 which, together with a U-shaped bracket 44 (FIGS. 2 and 4) secured to the bottom of the lower housing section 20 adjacent the pulley 40 and in surrounding relation to the pulley belt 42, serves as retaining means for maintaining the pulley belt entrained about the pulleys during periods of driving disengagement of the belt therewith, as will be explained. Pulley 41 may be readily attached to the driven shaft 13 of the lawn mower, after removal of its grass cutting blade (not shown), by a friction clamp 45 on the upper portion of the pulley.

As best seen in FIGS. 2 and 3, the mulching device includes adjustable means, generally indicated at 50, connected to and extending outwardly from the mulching chamber defining means 17, which means are adapted to engage the lawn mower 12 for connecting the mulching device 10 to the mower and for maintaining the respective shafts 39, 13 thereof in horizontally spaced relation. Adjustable means 50 comprises first and second elongate spacer means 52, 54 which extend generally outwardly from the mulching chamber defining means 17 and include respective clamp means 56, 58 which are horizontally spaced from each other for grippingly engaging respective first and second horizontally spaced portions of the lawn mower housing 12a.

First spacer means 52 comprises a first section composed of an elongate rod 60 (FIG. 3) which is rigidly attached to and extends generally horizontally outwardly from the lower housing section 20 of the mulching chamber defining means 17. The outer end of the rod 60 is bent downwardly and is pivotally connected for relative movement about a vertical axis to a second section of the first spacer means which is composed of a journaled bracket member 62. The bracket member 62 has a generally horizontally extending arm portion 62a which supports the clamp means 56.

Clamp means 56, the specific construction of which will be discussed hereinafter, grippingly engages the front vertical wall 67 of the mower housing 12a to maintain the left hand portion of the lawn mower, as seen in FIG. 3, spaced from the mulching chamber defining means 17 of the mulching device. Pivotal movement of the bracket member 62 and clamp means 56 relative to the rod 60 permits corresponding relative pivotal movement of the lawn mower 12 and mulching chamber defining means 17, for a purpose which will be explained.

Second elongate spacer means 54 extend generally outwardly from the mulching chamber defining means 17 and includes pivotal means for varying the horizontal distance of the clamp means 58 from the mulching chamber defining means to vary the distance of the lawn mower driven shaft 13 from the cutting means drive shaft 39. The pivotal means of the second spacer means includes a manually operable lever arm 70 pivotally connected at one end to a bearing block 72 on the lower housing section of the mulching chamber defining means for movement of the lever arm about a horizontal axis. A second arm 74 has one end thereof pivotally connected by means of a sleeve bearing 72a to the lever arm 70 at a point along the length of the arm spaced from the chamber defining means, and the opposite end of arm 74 is pivotally connected, by a journaled bracket member 75, to the clamp means 58 attached to the mower housing, thereby providing for movement of the second arm 74 about horizontal axes parallel to each other and to the horizontal axis of pivotal movement of the lever arm 70.

The clamp means 56 and 58 are of substantially identical construction and, for this reason, only the construction of clamp means 58, best shown in FIG. 2, will be discussed in detail. Clamp means 58 includes a generally U-shaped member 82, one arm of which is attached to and supported by an arm portion of the journaled bracket 75, and bolts 83, 84 which are threadably secured to the end portions of the arms of the U-shaped member 82 in opposing, endwise relation. The bolts are longitudinally movable toward and away from each other to grippingly engage the front vertical wall 67 of the mower housing 12a and vary the position of the gripped portion of the vertical wall 67 between the arms of the U-shaped member. By providing means to vary the gripped position of the mower housing within the confines of the U-shaped members of the clamp means 56, 58, the effective length of the adjustable means 50 of the mulching device may be incrementally varied to compensate for lawn mowers having housings of different horizontal dimensions, i.e., those having different distances between the front vertical wall of the housing and the centrally positioned rotatably driven shaft therein, thus facilitating the use of a single length pulley belt with rotary lawn mowers having different size housings.

To adapt the rotary lawn mower for driving the cutting means of the mulching device, it is only necessary to remove the mower cutting blade from the driven shaft 13 in the mower housing and attach the pulley 41 to the shaft by tightening its friction clamp 45. The pulley belt 42 is then entrained about the pulleys and the clamp means 56, 58 are secured in spaced positions along the front vertical wall of the mower housing. The lever arm 70 of the second spacer means is maintained in an upwardly extending position, as best shown by the broken lines 70' in FIG. 2, while the motor 14 of the lawn mower is started. When it is desired to operate the cutting means of the mulching device, the lever arm 70 is manually pivoted toward a horizontal position to extend the effective horizontal length of the second spacer means and move the right-hand front side of the lawn mower, as seen in FIGS. 1 and 3, and the opposing portion of the mulching chamber defining means away from each other, thereby increasing the distance between the lawn mower driven shaft and the mulching device drive shaft to tension and drivingly engage the pulley belt with the respective pulleys 40, 41 and provide rotation to the cutting blade 32 in the mulching chamber.

In like manner, when it is desired to stop rotation of the mulcher cutting means, the lever arm is manually raised to shorten the effective horizontal length of the second spacer means and correspondingly shorten the distance between the shafts 39, 13, thereby drivingly disengaging the pulleys 40, 41 to stop rotation of the cutting blade in the mulching chamber without having to cut off the lawn mower motor. For periods of continuous operation, the lawn mower housing may be maintained at an extended, fixed distance from the mulching chamber defining means by depressing the lever arm 70 to the substantially horizontal position shown in full lines in FIG. 2, thereby locking the spacer means 54 in an extended position to maintain driving engagement of the pulleys and pulley belt.

From the foregoing detailed description, it can be appreciated that the mulching device of the present invention may be quickly attached to and driven by power from an adjacently positioned rotary type lawn mower, and the operation of the cutting means of the mulching device may be effectively controlled by an operator without disturbing the power settings of the lawn mower, thus providing the homeowner and small gardener with a mulching device which is economical to purchase and is readily attached to and disattached from a conventional lawn mower to provide an efficient mulching operation.

In the drawings and specification, there has been set forth a preferred embodiment of the invention, and although specific terms are employed, they are used in a generic and descriptive sense only and not for purposes of limitation, the scope of the invention being defined in the claims.

That which is claimed is:

1. A mulching device adapted to be driven by power from an adjacent power driven rotary lawn mower of the type having an open-bottomed mower housing with a vertically disposed, rotatably driven shaft therein, and means spacing the housing and shaft above a supporting surface for movement thereover; said mulching device comprising
  (a) means defining a mulching chamber for receiving vegetation to be mulched,
  (b) rotatable cutting means in said chamber for shredding vegetation therein,
  (c) a rotatable drive shaft mounting said cutting means in said chamber and extending vertically therefrom,
  (d) means including a belt operatively connected to and extending outwardly from said drive shaft and adapted to be engaged and driven by the driven shaft of the lawn mower to operate the cutting means of the mulching device, and
  (e) releasable connecting means connected to and extending outwardly from said chamber defining means and adapted to engage the lawn mower for connecting the mulching device to the lawn mower and for maintaining the respective shafts thereof in horizontally spaced relation, said connecting means being adjustable whereby the distance between the shafts may be varied to thereby control engagement of said belt and operation of said rotatable cutting means.

2. Apparatus as defined in claim 1 wherein said means operatively connected to said drive shaft further includes a pulley mounted on said drive shaft and said belt frictionally engages said pulley and is adapted to be operatively connected to the driven shaft of the lawn mower.

3. Apparatus as defined in claim 2 wherein said adjustable means comprises first elongate spacer means extending generally horizontally outwardly from said chamber defining means and including clamp means adapted to grippingly engage a first portion of the lawn mower, and second elongate spacer means extending generally outwardly from said chamber defining means and including clamp means horizontally spaced from the clamp means of first spacer means and adapted to grippingly engage a second portion of the lawn mower horizontally spaced from the first portion, and said second spacer means further including pivotal means for varying the horizontal distance of said second spacer means clamp means from said chamber defining means to vary the distance of the lawn mower driven shaft from said cutting means drive shaft.

4. Apparatus as defined in claim 3 wherein said second spacer means pivotal means includes a manually operable lever arm pivotally connected at one end to said chamber defining means for movement about a horizontal axis, a second arm pivotally connected to said lever arm at a point along the length of said lever arm spaced from said chamber defining means and to said clamp means for movement about horizontal axes, whereby pivotal movement of said lever arm varies the distance of said second spacer means clamp means from said chamber defining means.

5. Apparatus as defined in claim 3 wherein each of said clamp means comprises substantially U-shaped members, and a bolt threadably secured to the end portion of each arm of said U-shaped member, in opposing endwise relation to each other, each of said bolts being longitudinally movable toward and away from each other and adapted to grippingly engage a portion of the lawn mower therebetween and vary the gripped position of said portion between the arms of said U-shaped member.

6. Apparatus as defined in claim 1 wherein said mulching chamber defining means includes upper and lower housing sections pivotally connected at one side thereof to permit ready separation of said sections for access to said chamber.

7. Apparatus as defined in claim 1 including a gravity feed hopper for receiving vegetation positioned above and communicating with said mulching chamber, and wherein said cutting means comprises a cutting blade rotatably mounted in said mulching chamber for rotation about a substantially vertical axis, the leading edge of said cutting blade forming a cutting surface and the trailing edge portion of said cutting blade being disposed downwardly to direct vegetation being cut downwardly in said mulching chamber and thereby facilitate proper feed of vegetation from said feed hopper into the mulching chamber and agitate vegetation in the chamber during the mulching operation.

8. In combination with a rotary lawn mower having an open-bottomed mower housing, a rotatably driven shaft vertically disposed therein, power means for rotatably driving the shaft, and means spacing the housing above a supporting surface for movement thereover; a mulching device positioned adjacent said lawn mower comprising
   (a) means defining a mulching chamber for receiving vegetation to be mulched,
   (b) rotatable cutting means in said chamber for shredding vegetation therein,
   (c) a rotatable drive shaft mounting said cutting means in said chamber and extending vertically downwardly therefrom,
   (d) rotatable means including a belt operatively connecting said shafts for transmitting rotation from said lawn mower driven shaft to said mulching device drive shaft for operation of the cutting means in said mulching chamber, and
   (e) releasable connecting means connected to the mulching chamber defining means and engaging said lawn mower for maintaining the driven shaft of the lawn mower horizontally spaced from the drive shaft of said mulching device, said connecting means being adjustable whereby the distance between the driven shaft and the drive shaft may be varied to thereby control engagement of said belt and rotation of the cutting means.

9. Apparatus as defined in claim 8 wherein said rotatable means connecting said shafts further includes first and second pulleys respectively mounted on said shafts in a generally common horizontal plane and said belt is entrained about said pulleys for transmitting rotation therebetween.

10. Apparatus as defined in claim 9 including retaining means operatively associated with each of said pulleys for maintaining said pulley belt entrained about said pulleys during driving disengagement of the belt therewith.

11. Apparatus as defined in claim 8 wherein said adjustable means includes first and second elongate spacer means connected to and extending outwardly from said mulching chamber defining means and having clamp means at their outer extremities grippingly engaging said mower housing at horizontally spaced positions thereon, said first spacer means including first and second sections pivotally connected for movement about a substantially vertical axis, and said second spacer means being manually pivotable to vary its effective horizontal length and pivotally move said lawn mower and mulching chamber defining means relative to each other about the pivotal connection of said first and second sections of said first spacer means to vary the distance between said shafts and drivingly engage and disengage the pulley belt from said pulleys to control rotation of said cutting means.

12. Apparatus as defined in claim 11 wherein said second spacer means includes a manually operable lever arm pivotally connected to said mulching chamber defining means for movement about a substantially horizontal axis and being positionable between a first generally upwardly extending position to shorten the effective horizontal length of said second spacer means to drivingly disengage said pulley belt from said pulleys, and a second substantially horizontal position to extend the effective horizontal length of said second spacer means and drivingly engage said pulley belt with said pulleys; and wherein said clamp means of said first and second elongate spacer means comprises means for incrementally varying the distance between said shafts when the length of said second spacer means is horizontally extended to facilitate the use of a single length pulley belt with rotary lawn mowers having different size housings.

References Cited
UNITED STATES PATENTS

| | | | |
|---|---|---|---|
| 2,793,667 | 5/1957 | Hall | 146—124 |
| 2,822,846 | 2/1958 | Ward | 146—124 X |
| 2,861,611 | 11/1958 | Considder | 146—124 |
| 3,049,857 | 8/1962 | Shaw | 146—124 X |

W. GRAYDON ABERCROMBIE, Primary Examiner

U.S. Cl. X.R.
56—25.4; 241—101